United States Patent [19]
Jenike et al.

[11] 3,797,707
[45] Mar. 19, 1974

[54] BINS FOR STORAGE AND FLOW OF BULK SOLIDS

[75] Inventors: Andrew W. Jenike, Winchester; Jerry R. Johanson, Chelmsford, both of Mass.

[73] Assignee: Jenike and Johanson, Inc., Burlington, Mass.

[22] Filed: Apr. 20, 1971

[21] Appl. No.: 135,584

[52] U.S. Cl. .................................. 222/193, 222/462
[51] Int. Cl. .............................................. B65d 83/06
[58] Field of Search ........... 222/193, 195, 460, 461, 222/462, 547, 564

[56] References Cited
UNITED STATES PATENTS

| | | | |
|---|---|---|---|
| 1,968,641 | 7/1934 | Greig | 222/547 X |
| 2,884,230 | 4/1959 | Pyle et al. | 222/195 X |
| 2,979,235 | 4/1961 | Greaves | 222/195 X |
| 3,125,256 | 3/1964 | Kokeisl | 222/195 |

FOREIGN PATENTS OR APPLICATIONS

| | | | |
|---|---|---|---|
| 458,386 | 8/1913 | France | 222/564 |
| 345,708 | 9/1936 | Italy | 222/547 |
| 398,784 | 4/1965 | France | 222/195 |
| 714,067 | 10/1941 | Germany | 222/195 |
| 1,281,945 | 10/1968 | Germany | 222/195 |

Primary Examiner—Robert B. Reeves
Assistant Examiner—Frederick R. Handren
Attorney, Agent, or Firm—Kenway & Jenney

[57] ABSTRACT

Bins for storage and flow of bulk solids have stepped hopper surfaces adapted to increase and render constant the rate of flow at the hopper outlet. The stepped surfaces have friction and slope angles adapted to satisfy the criteria for mass flow, and provide spaces for injecting fluid at one or more perimetric interfaces with the moving solids.

3 Claims, 5 Drawing Figures

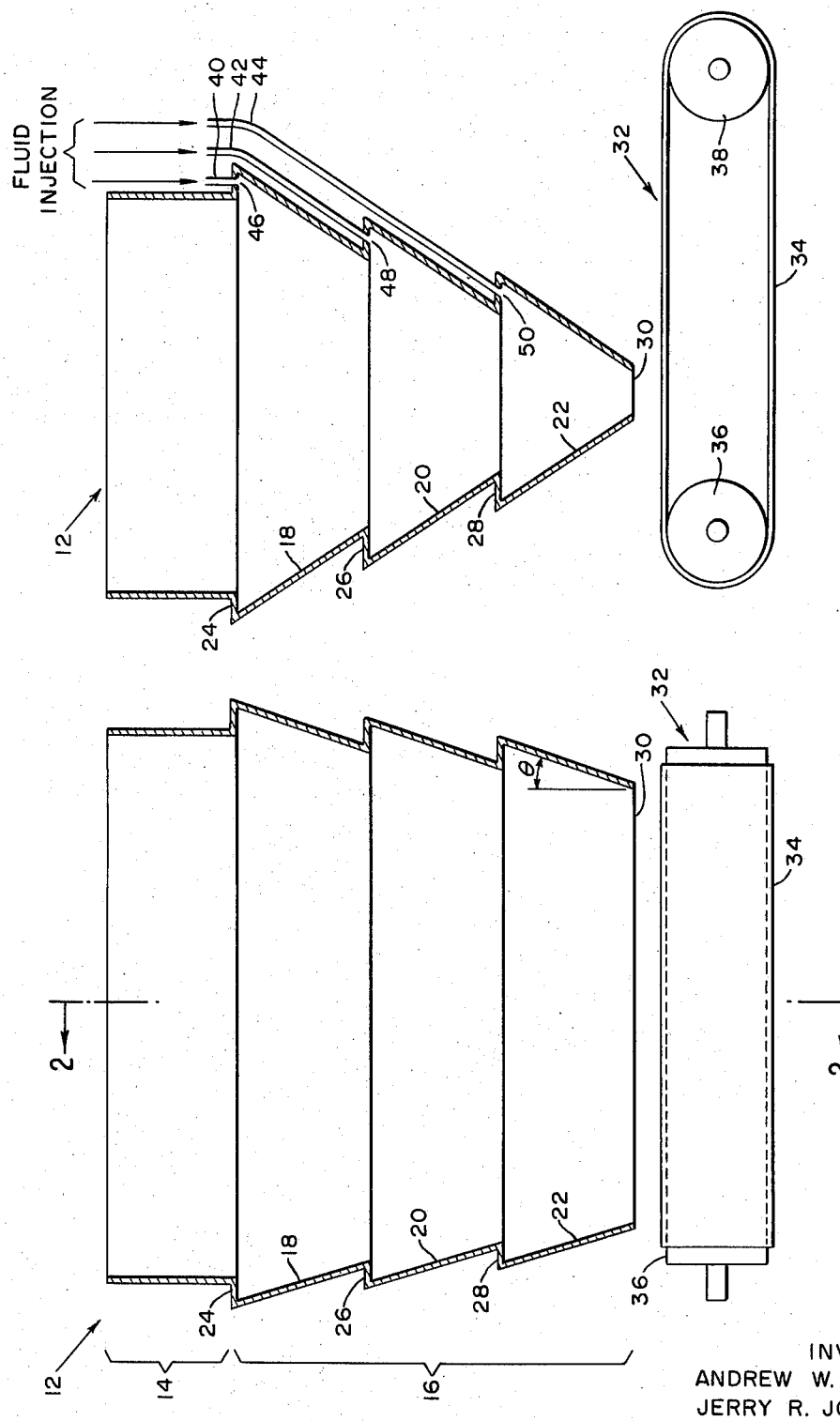

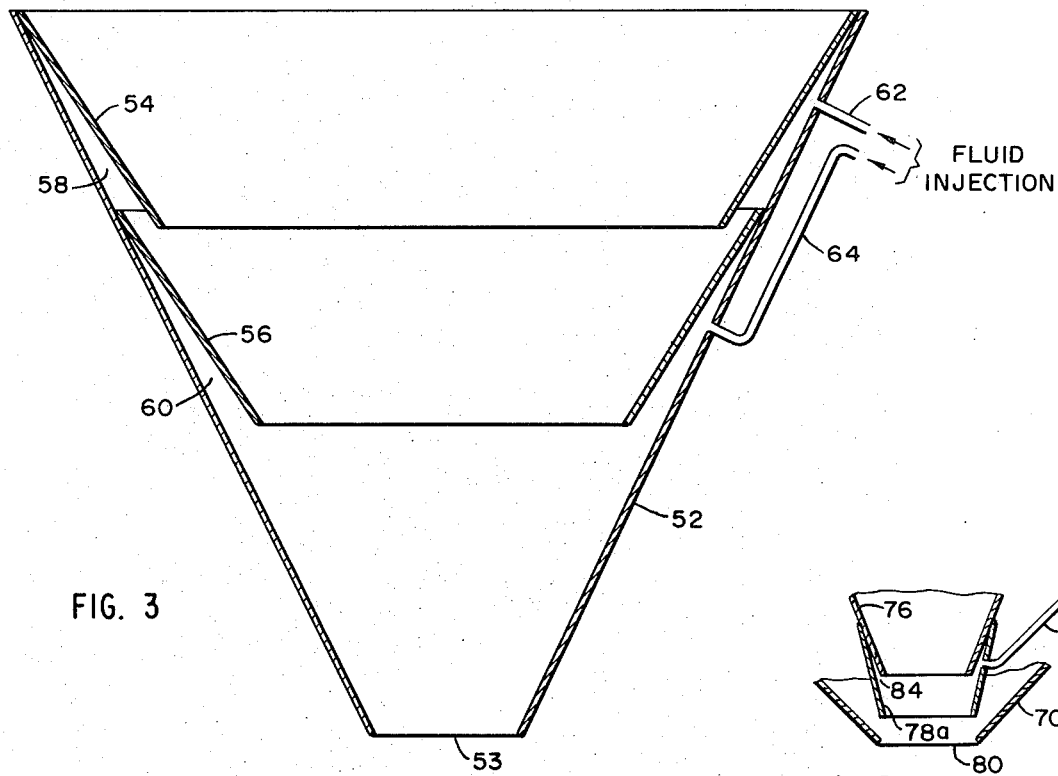
FIG. 3
FIG. 5
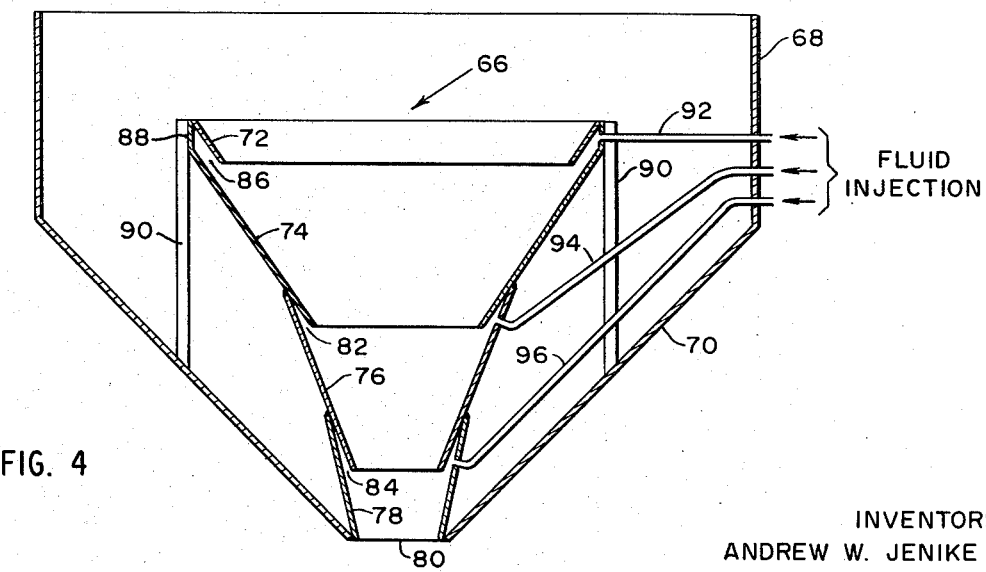
FIG. 4
INVENTORS
ANDREW W. JENIKE
JERRY R. JOHANSON
BY Kenway, Jenney &
Hildreth
ATTORNEYS

BINS FOR STORAGE AND FLOW OF BULK SOLIDS

BRIEF SUMMARY OF THE INVENTION

This invention is concerned generally with storage bins for bulk particulate solids, the bins having converging wall portions or hoppers with outlets ideally intended for a constant, high rate of outflow of material. The material fed into the bins may comprise bulk solid dispersions of various kinds including dry powders and aggregates. The particle sizes in aggregates may be uniform or distributed over a more or less wide range of dimensions. Examples include powders used in industry and comminuted ore and mineral mixtures.

More particularly, this invention is concerned with providing bins for the storage of the bulk solids and outflow of the solids or slurrys of the solids in a stream at constant, controlled rates for purposes of subsequent industrial operations. A principal requirement of such operations is a prescribed rate of feed from the hopper. Closely related to this are other important requirements. To be efficient, a storage plant should contain a known volume of solid and feed it at the required time, with minimal degradation of the material and with maximum uniformity in the density of the mixture.

Typical subsequent operations may be carried out by one or a combination of such widely differing apparatus as contact-bed reactors, rolling and briquetting presses for bulk solids and bagging, loading and packaging machinery of a great variety presently used in industry.

Storage bins in current wide use frequently fail to meet the requirements mentioned above in certain conditions and with certain types of solids. Of particular concern are the following undesirable conditions:

1. "No flow." A stable arch, also termed a dome, or a "rathole," develops within the solid and flow ceases.
2. "Erratic flow." Momentary arches or ratholes form within the solid and then partially or completely empty out or collapse at irregular intervals. This causes the density of the stream to swing between wide limits.
3. "Flushing." When erratic flow exists in powders, the particles falling through an arch or rathole may aerate and assume the properties of a fluid (an effect called "fluidizing"), with the result that effective control over the rate of flow is lost.
4. "Insufficient storage capacity." A large part of the stored solids remain in fixed position around a rathole, instead of flowing into the stream.
5. "Segregation." Differing constituents of an aggregate are present in differing fractions at the hopper outlet.
6. "Degradation." Spoilage, caking, oxidation and attrition may occur if certain solids remain in a bin for an extended period of time. Degradation usually results from a "first-in, last-out" sequence of flow. In some bins the solid from the bottom of the bin is not discharged until the bin is completely emptied out.
7. "Inadequate level control." In bins that rathole it is not possible to ascertain accurately, by observation of the surface level, the quantity of solid in the bin.

Techniques hitherto used in an attempt to overcome these difficulties include manually prodding the bin contents, shaking or severely vibrating the hopper, injecting gas along the axis of the hopper or into porous pads located on the hopper walls, and installing rotary valves or "air locks" for the solid at the hopper outlet. These methods have not met with complete success in practice. In many installations with existing bins that exhibit any one or more of these undesirable conditions, it may be prohibitively expensive to substitute new bins of a different design to improve the flow of material, especially in cases where only a limited amount of material of a given type is to be stored and fed. Hitherto, in such cases it has generally been considered necessary to resort to the above techniques to restore flow.

This invention minimizes the necessity of using the above remedial measures or of replacing entire bins by use of a novel stepped hopper design in conjunction with perimetrical fluid injection. This design has the property of permitting very high flow rates, particularly of fine materials or powders such as clay, flour and various ores and concentrates.

Bins according to this invention cause "mass flow" of the solid from the hopper outlet under conditions where such flow would not otherwise prevail. In "mass flow" all of the solid is in motion whenever any of it is drawn out. This is in contrast to "funnel flow" which is characteristic of most existing bins. In "funnel flow" the material moves toward the outlet through a channel extending upwards from the feeder or gate. The channel expands from the outlet to a circular shape and is surrounded by non-flowing solid. As the solid flows out, the level of the solid in the channel drops and layers of the non-flowing solid slough off the top of the surrounding mass, sliding into the channel. It has been recognized that this type of flow is largely responsible for the undesirable conditions of flow previously mentioned.

By means of this invention, mass flow is substituted for funnel flow through the provision of stepped hopper elements or sections having smoothness and steepness of slope with a defined relation to the properties of the solid. For example, in certain cases where mass flow is not occurring in an existing hopper because the hopper walls are insufficiently steep or the desired flow rate is too high, stepped inserts may be employed in conjunction with fluid injection to cause mass flow and speed up the flow rate. In other cases, by similar means the head room required by any new or existing bin may be reduced to fit a given space or for reasons of economy in construction, without sacrificing the properties of mass flow at high flow rates.

It has been found that one of the difficulties confronted in establishing and maintaining steady flow is the result of the low fluid pressure that exists in the interstitial spaces between the particles of solid at and near the region of the hopper outlet. This is particularly noted in the case of powdered material. As the solid is deposited at the top of the bin it is unconsolidated and the interstitial spaces are relatively large. As the solid flows down into the bin it becomes progressively more consolidated because of the weight of the material above it, causing the interstitial spaces to decrease in volume and thereby causing the interstitial pressure to increase above the ambient. Some air then escapes upwardly toward the top of the bin. Eventually, the interstitial pressure levels off in a lower portion of the vertical part of the channel. After the solid reaches the hopper portion, a reverse change occurs and the interstitial spaces increase in volume as the solid continues to flow downwardly toward the outlet. The interstitial pressure decreases and is actually reduced below ambient in a region near the outlet. Directly at the outlet the pressure returns to ambient. The high fluid pressure gradient in the vertical direction has the effect of holding up the flow of solid and critically affects the rate of gravity flow of powders. To overcome these effects, this invention embodies further features whereby, in the critical region of the hopper, fluid is injected into the mass of solid at perimetrical spaces formed by the stepped hopper elements, at pressures and in quantities that are effective to increase the interstitial pressure, thereby permitting a higher and steadier rate of flow. While the quantity of fluid injected is sufficient for this purpose, it is limited so that in the case of powders and the like, it does not "fluidize" them and cause loss of control of the feed.

By means of the foregoing and other features, that will become evident from the following description, this invention provides optimum mass flow conditions to prevail in use, irrespective of the properties of existing bins with respect to the material being stored and fed, if such bins are used.

BRIEF DESCRIPTION OF THE DRAWING

FIG. 1 is a front elevation in section of a rectangular oblong bin with a stepped fluid injection hopper embodying the invention.

FIG. 2 is a side elevation in section taken on line 2—2 of FIG. 1.

FIG. 3 is an elevation in section of a hopper with a first form of conical inserts for fluid injection.

FIG. 4 is an elevation in section of a hopper with a second form of inserts for fluid injection.

FIG. 5 is a fragmentary elevation showing a variation of the structure in FIG. 4.

DETAILED DESCRIPTION

Referring to FIGS. 1 and 2, there is shown a bin designated generally at 12 and comprising a straight-sided upper section 14 and a hopper section 16. To conserve space in the drawing, the upper section 14 is shown as being short in length relative to the hopper section, but it will be understood that in practice the section 14 may have any desired height.

The hopper section 16 comprises a number of elements 18, 20 and 22 with mutually approximately parallel inwardly sloping walls joined end-to-end with one another and with the upper section by flanges 24, 26 and 28. The elements 18, 20 and 22 converge inwardly toward a rectangular slot-shaped hopper outlet 30. The outlet is situated over a feeder designated generally at 32, illustrated as comprising an endless belt 34 passing over rotating pulleys 36 and 38. In mass flow bins of the type herein described, the hopper and feeder are considered as an integral unit and the feeder is of the type adapted to draw the solid through the whole area of the hopper outlet. Suitable feeders are well known and include not only belts of the type illustrated but also rotary vane feeders, tapered screw feeders, variable pitch screw feeders, etc. In every case, the aim of the feeder is to assure flow from the hopper to the feeder across the entire area of the outlet 30. Throughout the following discussion, references to the feeder refer to any available form of feeder which accomplishes this aim. A shut-off gate may also be used in place of the feeder.

Fluid ducts 40, 42 and 44 are fitted in any suitable way to fluid injection ports 46, 48 and 50, respectively, located at suitable positions in the flanges 24, 26 and 28. Under normal conditions in which the level of solid is within the upper section 14, perimetrical void spaces exist at the regions of the ports 46, 48 and 50, whereby fluid injected at the ports has an interface with the moving solid in the hopper preferably continuously around the periphery thereof. The fluid is injected at ambient or positive gage pressure of predetermined magnitude sufficient to achieve a steady mass flow of the solid. The dry particulate solid material that is fed into the top of the bin is thereby efficiently mixed with the fluid which tends to fill the interstitial spaces between the particles in the region of convergence where these spaces are increasing, increasing the volume in some cases as much as 10 to 30 percent. In use, the material added to the top of the bin generally comprises essentially dry powder or a particulate aggregate. In certain applications air or some other gas or gas mixture is injected at the ports 46, 48 and 50 in order to overcome the reduction in the interstitial pressure, thereby achieving a greater and steadier flow. In other applications, a liquid is injected at one or more of the ports, the liquid converting the dry material into a slurry. In the latter case, the feeder 32 would be replaced with a slurry receptacle. Slurrys formed in this way are very uniform in composition, and thereby the frequent problem of "slugging" is effectively eliminated. This problem has frequently occurred in practice, and is characterized by a very dense mix of solid and liquid followed by essentially clear liquid.

The configuration of the wall of the upper section 14 and the walls of the elements 18, 20 and 22 of the hopper section 16, when viewed in horizontal cross section, may be varied from the particular rectangular oblong configuration shown in FIGS. 1 and 2. For example, it may be square, diamond, oval or circular in shape. In addition, the shape of the upper section 14 may differ from that of the hopper section 16, if desired. In certain applications the design is preferably such as to avoid sharp corners within the hopper section. In any of the above cases, the structure is such as to provide inwardly converging walls corresponding to the elements 18, 20 and 22, with preferably continuous peripheral fluid-solid interfaces in the regions of fluid injection ports corresponding to the ports 46, 48 and 50, and without protrusions of any kind into the hopper.

According to this invention, it is also important that the inwardly converging walls of the elements 18, 20 and 22 shall have a sufficiently steep slope and sufficient surface smoothness to satisfy the requirements for mass flow of the solid material. The type of flow in a bin, whether it be funnel flow or mass flow, is determined primarily by the shape of the horizontal section of the hopper, by the kinematic angle of friction between the stored solid and the walls of the hopper elements, and also by the hopper slope angles measured as the angles between the vertical and the surfaces of these walls. Measurements have shown that for a given hopper slope angle there is a particular angle of friction below which the flow is mass flow and above which the flow is funnel flow; also that, if the hopper slope angle is decreased from the foregoing value, there is an increase in the corresponding angle of friction separating the mass flow condition from the funnel flow condition. These functional relationships depend, of course, upon the particular solid material including the particle shapes and sizes, through the effect of these properties upon the angle of friction.

It is also necessary that the dimensions of the hopper outlet 30 shall be greater than the critical dimension below which the particular solid has the ability to form a dome that would interrupt the flow. Experimental methods for determining this critical dimension are currently available in the art.

In some applications a simplified bin construction can be employed to achieve the above-mentioned advantages. In such design the elements 20 and 22 are eliminated and the element 18 extended, at the slope angle shown, down to the hopper outlet 30.

The present invention may be embodied in the design of the bin itself as in FIGS. 1 and 2, or in inserts for existing bins as illustrated in FIGS. 3 and 4. Referring to FIG. 3, there is shown a hopper 52 having an outlet 53. Inserts 54 and 56 are placed in and supported at their rims by the hopper. If the hopper 52 is frusto-conical in shape the inserts 54 and 56 are also frusto-conical with larger slope angles, thereby providing a stepped configuration with annular spaces 58 and 60. Fluid injecting ducts 62 and 64 are connected with these annular spaces through suitable openings in the hopper 52. As in the case of FIGS. 1 and 2, the moving solid flows downwardly without filling the spaces 58 and 60, thereby creating annular interfaces between the solid and the injected fluid, which may be gaseous or liquid. The inserts 54 and 56 may have a different surface finish from that of the hopper 53, if desired. Also, the slope angles of the inserts may be the same, as shown, or they may either increase or decrease from the outlet 53 toward the top of the hopper 52.

It will be apparent that the hopper 52 and the inserts 54 and 56 may have shapes other than frusto-conical. For example, they may be circular, oval, rectangular, square or some other shape as in the case of FIGS. 1 and 2. Also, only a single insert such as 54 may be used in some cases.

FIG. 4 illustrates a different embodiment of the invention comprising an insert structure 66 to be received within an existing bin 68, the bin 68 having a hopper 70. The structure 66 comprises a plurality of elements 72, 74, 76 and 78 which are nested, converging upon the outlet 80 of the bin 70.

In this embodiment the elements 74, 76 and 78 have cone angles that decrease from the top toward the bottom, thereby creating annular or perimetrical spaces 82 and 84. An annular space 86 between the elements 72 and 74 is provided by forming the element 74 with a vertical wall portion 88 against which the element 72 is fitted at its rim. The wall 88 also conveniently provides a surface for securing a plurality of vertical support posts 90 extending down to the hopper 70. Thus the lower wall of the hopper 70 supports the structure 66, as contrasted to the inserts 54 and 56 of FIG. 3 that engage the hopper 52 at their upper extremities or rims.

Fluid injection ducts at 92, 94 and 96 communicate with the perimetrical spaces 86, 82, and 84, respectively, thereby providing solid-fluid interfaces in a manner similar to those described above with reference to FIGS. 1 to 3. The fluid may be gaseous or liquid.

The configurations of the various elements of the insert structure 66, when viewed in horizontal cross section, may take various forms as described above with reference to FIGS. 1 to 3. It will be understood that in use, the stream of solid enters the element 72 and that the flow within the insert structure 66 is mass flow. The bin 68 and hopper 70 are generally filled with solid, and that part of the solid that falls between the bin 70 and the structure 66 remains static and in place until after the feeding operation is completed and the structure 66 has been removed from the bin. Although the structure 66 has smaller lateral dimensions than those of the hopper 70, the flow is generally increased because mass flow obtains within the structure 66 and fluid is injected into the interstitial spaces.

In the variation of FIG. 5, the construction is the same as in FIG. 4 except that the element 78 is replaced by an element 78a that has its lower end situated above the hopper outlet to provide a peripheral gap through which solid can be discharged from the hopper into the outlet opening.

The use of the stepped hopper structures described above provides substantial improvements in many operations. Funnel flow bins produce a first-in, last-out flow sequence that may result in degradation of some products as a result of remaining in a bin for an extended period of time. Funnel flow further results in ratholing or flushing of powders as a result of the fluidizing thereof. The present invention provides mass flow. This is characterized by a first-in, first-out sequence of flow, wherein powders are deaerated as they move down toward the hopper and are not flushed as long as a minimum level of solid is retained in the hopper. This is accomplished without the use of air locks. Flow is uniform and well-controlled, and the density of the feed is constant and independent of the head of solid in the bin.

It will also be appreciated that this invention may be realized in the form of an expanded flow bin, that is, a short mass flow hopper-feeder unit installed under a funnel flow bin. The mass flow hopper serves to expand the size of the flow channel to a dimension that eliminates the possibility of ratholing, insures deaeration and smooth flow, and reduces segregation to acceptable levels. This application is useful in the storage of large quantities of non-degrading solids, like ores. In this case a low-level indicator can be placed within the mass flow hopper. If desired, several mass flow hopper-feeder units can be placed under a storage pile or under a large funnel flow bin.

Other uses and variations of this invention, in addition to those hereinabove discussed, will be evident to persons skilled in the design of bulk solid storing, feeding and handling equipment, once the principles of this invention are clearly understood.

We claim:

1. A bin for a particulate solid having, in combination, a plurality of elements each comprising a closed perimetrical wall having a downwardly and inwardly sloping inner surface, at least one of said elements having its inner surface sloping inwardly at a predetermined angle measured from the vertical, said angle being related to the kinematic angle of friction between the solid and said sloping inner surface to satisfy a condition for mass flow of the solid, the elements having differing angles of slope of their inner surfaces and being arranged in sequence with the lower end of the inner surface of one element situated inwardly of the upper end of the element immediately below it, thereby forming an unobstructed peripheral space open to the interior of the bin, and means for injecting a fluid into said space at a pressure sufficient to achieve mass flow of the solid but insufficient to fluidize it.

2. A bin according to claim 1, in which the angles of slope decrease in the direction from the uppermost element toward the lowermost element.

3. An insert structure for a bin for a particulate solid having a hopper with an outlet therein, said insert structure having, in combination, a plurality of elements each comprising a closed perimetrical wall having a downwardly and inwardly sloping inner surface, at least one of said elements having its inner surface sloping inwardly at a predetermined angle measured from the vertical, said angle being related to the kinematic angle of friction between the solid and said sloping inner surface to satisfy a condition for mass flow of the solid, the elements being arranged in sequence with the lower end of the inner surface of one element situated inwardly of the upper end of the element immediately below it, thereby forming an unobstructed peripheral space open to the interior of the insert structure, the lower end of the lowermost element being situated above the outlet to provide an opening to the outlet for material between the insert structure and the hopper, and means for injecting a fluid into said space at a pressure sufficient to achieve mass flow of the solid but insufficient to fluidize it.

* * * * *